UNITED STATES PATENT OFFICE.

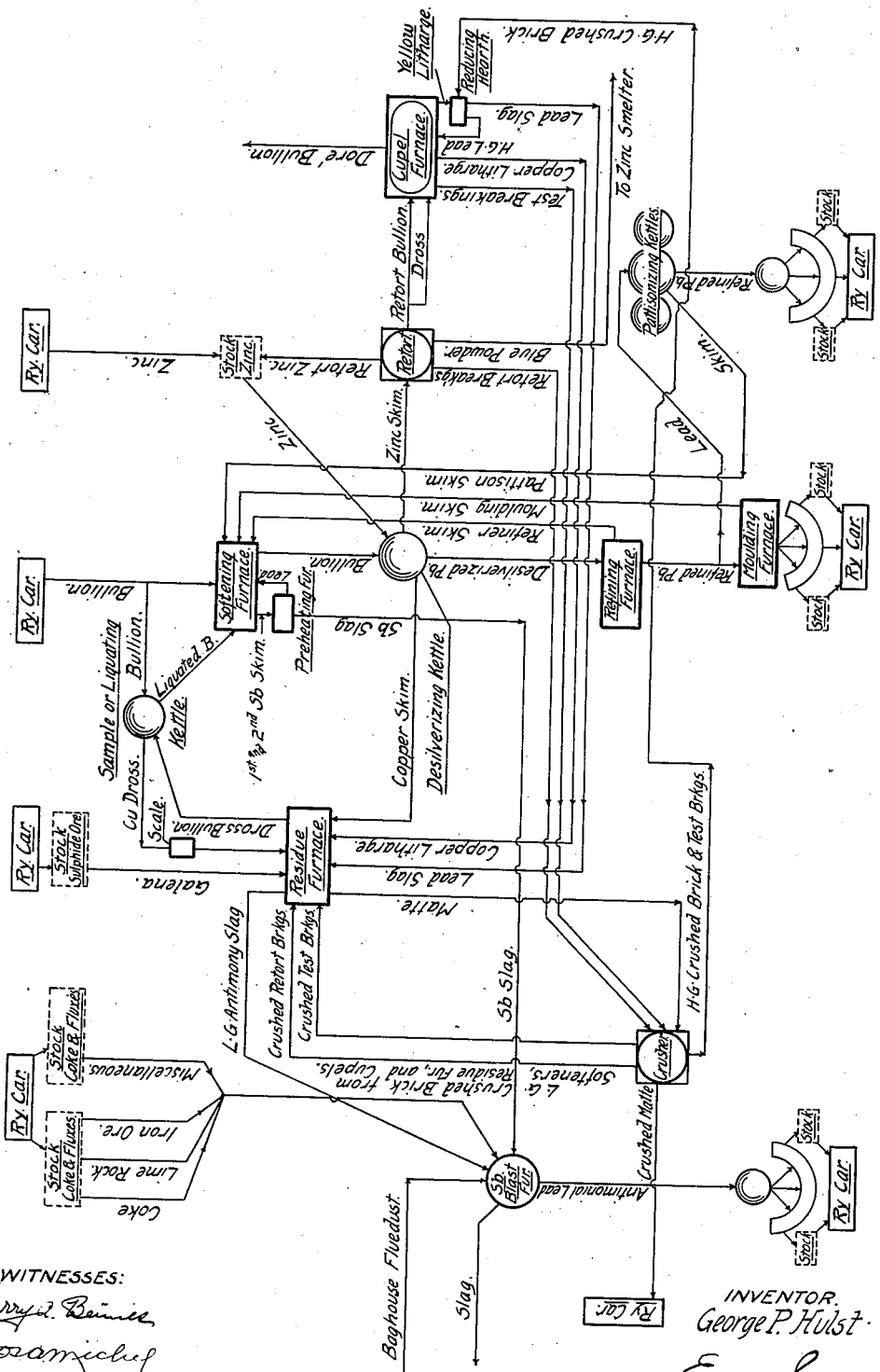

GEORGE P. HULST, OF HAMMOND, INDIANA.

PROCESS OF TREATING LEAD BULLION.

1,285,714.  Specification of Letters Patent.  Patented Nov. 26, 1918.

Application filed March 20, 1918. Serial No. 223,573.

*To all whom it may concern:*

Be it known that I, GEORGE P. HULST, a citizen of the United States, residing at Hammond, in the county of Lake and State of Indiana, have invented certain new and useful Improvements in Processes of Treating Lead Bullion, of which the following is a full, clear, and exact description, reference being had to the accompanying drawings, forming a part hereof.

In the refining of lead bullion by what is known as the Parkes process, the bullion is first charged either directly into a softening furnace, or thrown into kettles and melted down and then pumped into the softening furnace. The softening operation comprises two steps, to wit, liquation and oxidation, the metals held in solution by the red-hot lead being in a measure separated out in the liquating step, and metals alloyed with lead and more easily oxidized than lead, being separated out in the oxidizing step. The impurities removed by the softening process (liquation and oxidation) are in the form of copper dross, and a slag or skim containing oxids of lead, arsenic, and antimony with small percentages of copper and other impurities when present, and metallic shot lead bullion which contains silver and gold. This slag is cooled down or dumped directly into the residue furnace. Usually there are two skims of the slag taken from the softening furnace, these being treated in the residue furnace with a proper complement of coal and lead sulfid ore giving a resulting antimony slag free from silver which is subsequently smelted with refinery skim in the blast furnace to antimonial lead; a hard lead bullion which is retreated (in the liquating kettles and softening furnace); and a lead copper matte which is sent to the smelter and bessemerized.

The primary object of the present invention is to dispense with the residue operation or treatment of the skims or oxids aforesaid in the residue furnace, thereby effecting a material saving in the cost of treatment of the bullion. To effect this saving however, care must be taken to segregate and remove from the charge of bullion in the liquating kettle as much of the copper as possible, or to such an extent that it gives no trouble in the later stages of the process. In practice the copper should be removed from the metal in the liquating kettle to bring the bullion down to .05% (or less) copper. The removal of the copper from the bullion in the liquating step to the extent here indicated, leaves the softening furnace in which the oxidizing step is conducted, free to operate on a practically decopperized charge, or one from which the harmful percentage of copper has been eliminated. By subjecting the liquated decopperized bullion to oxidation in the softening furnace, the impurities such as arsenic, antimony and the like are separated in the form of a skim or antimony slag composed principally of lead antimony arsenic oxid (with 1% to 3% of silica coming from the furnace linings), this slag being subsequently treated in the antimony blast furnace for the production of antimonial lead. In the present embodiment of the invention, the liquated decopperized bullion is subjected to oxidation in the softening furnace, preferably in the presence of suitable oxidizing agents such as the skim from the refining furnace (a lead zinc oxid), molding skim (a lead oxid), or skim from the pattisonizing kettles, the said oxidizing agents materially hastening the softening operation, their use resulting not only in a better cooked charge but in a greater direct output of lead as will herein later more fully appear. A further object of the invention is to remove from the antimony slag above referred to, all the mechanically suspended lead bullion by subjecting the skims from the softening furnace before their treatment in the blast furnace, to a preliminary treatment in a preheating furnace without reduction with lead sulfid or coal, the preheating action (in which the temperature is raised to make the slag very liquid) causing the bullion to drop and settle out of the slag and carry down the silver and gold, the bullion being returned to the softening furnace. A further object is to treat (in a blast furnace) the antimony slag aforesaid in conjunction with outside lead drosses free from silver, thereby producing good, clean, marketable antimonial lead, and eliminating the use of the residue furnace for the treatment of the first and second skimmings from the softening furnace as is now done under the old process. A further object is to effect a material saving of zinc in the desilverizing kettles, to reduce the cost of retorting and cupel operations by segregating and removing the copper from the bullion before the latter is charged into the softening furnace. A further object is to treat the copper drosses from the liquating operation, the copper skims from the desilverizing kettle, the copper litharge from the cupels, and lead slag from the reducing hearth, in the residue furnace with a proper complement of lead sulfid ore (galena) with a view of producing a lead copper matte, dross bullion, and a slag free from silver (and copper), said slag going to the blast furnace to be treated in conjunction with the antimony slag from the preheating furnace, for the production of antimonial lead, the dross bullion being liquated or returned to the liquating kettle, and retreated in the softening furnace, and the matte subsequently bessemerized. In the old process the copper skims from the desilverizing kettles went to the softening furnace, an objection avoided by the new process, the presence of copper in the softening furnace not being desired, constituting as it does an interfering element in the later desilverizing operation. A further object of the invention is to effect by proper treatment on a reducing hearth, a partial reduction of the litharge coming from the cupels and to return the high grade metal thus produced to the cupels for retreatment, the resulting lead slag being charged into the residue furnace for the recovery of any copper in the form of lead copper matte. The advantages of the new process will be readily apparent from the following detailed description in connection with the accompanying drawing in which—

The figure represents a flow sheet of the several steps involved in the new process. The various instrumentalities employed in carrying out the successive steps of the process are fully designated on the flow sheet so that a reference thereto may be made without the necessity of identification thereof by reference letters or numbers as will be clearly apparent from an examination of the flow sheet. Some of the individual steps involved in the new process are old *per se*, and to these I make no claim, the novelty of the process residing in the sequence of steps by which the several objects above enumerated are attained. The invention will now be described in connection with the flow sheet detailing the various steps of the process.

The lead bullion is taken from the car and charged into the liquating kettle (which also serves as a sampling kettle) where it is heated to the melting or liquating point, the metal being stirred by repeated blowing with air or steam through a pipe inserted thereinto and held in the hands of the operator, the pipe being connected to a suitable air or steam line as well understood in the art. This operation raises the copper dross, the latter floating on the surface of the molten metal from which it is skimmed and then charged into the residue furnace. In the liquating operation the drossing of the copper is carried to the point where the bullion in the kettle drops to .05% copper (the copper in the liquating kettle may even be lowered to .03%), the object sought being to reduce the copper content of the lead bullion charged into the softening furnace to the lowest possible degree so as not to interfere with the desilverizing operation later on. The lead in the liquating kettle, after thorough drossing or skimming off of the copper dross is pumped into the softening furnace (reverberatory) where the lead is subjected to oxidation (by air) preferably in the presence of suitable oxidizing agents added to the charge to hasten the softening operation. In the present embodiment of the invention these oxidizing agents comprise (1) refiner skim which is a lead zinc oxid, the oxygen of the oxid taking up arsenic and antimony and dropping lead to the extent that the arsenic and antimony are taken up in the slag, the presence of the zinc which goes into the slag materially reducing the lead content of the slag and thereby increasing the direct output of lead; (2) molding skim which is a lead oxid; (3) Pattison skim (a lead oxid); or (4) impure lead oxids derived from other or outside sources may be used. Where refiner skims or equivalent oxidizing agents are employed in the softening furnace there is no occasion to blow air into or stir the mass, but merely bring the heat up to slagging temperature. The resulting slag is principally a lead antimony arsenic oxid in which a considerable portion of lead bullion is held mechanically or in suspension, the bullion carrying silver and gold. To release this bullion the slag is skimmed from the metal in the softening furnace (there are two skimmings) and charged into a preheating furnace or settler in which the mechanically held lead bullion is dropped, the preheating of the slag causing it to become very liquid thereby releasing the lead bullion which is returned to the softening furnace. The preheating furnace is fired preferably with an oil burner. The antimony slag after all the metallic bullion has settled out of it is conveyed either directly to the blast furnace for the production of antimonial lead, cutting out the treatment in the residue furnace under the old process; or, it may be run into slag pots and taken direct to the antimony slag pile after which it may be treated for antimonial lead. It may be stated in passing that under the new process (which cuts out the treatment of the slag or skims from the softening furnace in the residue furnace) the slag, (or skimmings) from the softening furnace (before treatment in the preheating furnace) contains substantially 20% arsenic and antimony, .55% lead, 6% to 8% zinc, .1% copper, .8 to 1 ounce of silver, the copper being considerably less than in the resulting slag from the subsequent treatment of the first and second skims (from the softening furnace) in the residue furnace under the old process, where the copper content ranges form .3% to .5%, and the silver 1 to 1.5 ounces.

Where the lead bullion already runs low in copper it is charged direct into the softening furnace without preliminary treatment in the liquating kettle. This applies to bullion which has been liquated to .05% copper at the smelter, thus cutting out the liquating operation at the refinery.

After the bullion in the softening furnace has been thoroughly cooked, and the impurities (arsenic, antimony and the like) have been oxidized and driven into the slag and the latter skimmed off or removed, the bullion thus cooked is tapped into the desilverizing kettle which when full is drossed clean of the copper skim that forms in the kettle on account of a little zinc left in the lead or on the sides of the kettle alloying with any copper that may be present, said alloy as it forms being brought to the surface and skimmed off and charged into the residue furnace together with copper dross from the liquating kettle and slag from the reducing hearth (to be presently referred to) the idea being to eliminate the copper from the softening furnace to the greatest possible extent. Under the old process the copper skim from the desilverizing kettle went to the softening furnace. The lead bullion in the desilverizing kettle having been drossed clean of its copper skim is now ready for the zinc which is added to the bullion and the desilverization carried on in the usual way well known in the art. Under the new process however, by the time the lead bullion reaches the desilverizing kettle the copper content has been practically eliminated (being so low as to be negligible) so that less zinc is required to take up the silver (and gold) making less zinc skim to go to the retorts; also the desilverized lead if properly treated in the desilverization, will have less zinc and silver. From the desilverizing kettle the desilverized lead goes to the refining furnace, and the zinc skim goes to the retort as indicated on the flow sheet. The refining furnace is a reverberatory furnace heated with outside fire box, the desilverized lead in the furnace being brought to a good red heat and the zinc and impurities such as arsenic and antimony in small percentages are oxidized by steam inserted in the furnace by steam pipes, the resulting agitation of the lead forming a refiner skim containing 75% to 80% lead, 8% to 10% zinc, arsenic and antimony in small percentages, and from 10% to 12% of oxygen. This skim is a good oxidizing agent and, as previously pointed out, is utilized as such in the softening furnace.

The refined lead in the refining furnace after the refiner skim is removed, is tapped into the molding furnace or reverberatory receiver. In running the refined lead bullion into the molding furnace a certain amount of lead oxid is formed; and while standing during the molding operation this lead oxid along with some metallic lead is skimmed off into a pan and subsequently, if needed, is charged into the softening furnace and used as an oxidizing agent in the manner previously pointed out. In the flow sheet a part of the refined lead from the refining furnace is shown as going into the pattisonizing kettles where it is still further refined by the well known Pattison process of melting and crystallization. In the pattisonizing operation lead oxid will likewise be formed, this being skimmed off and if needed, subsequently charged into the softening furnace and used as an oxidizing agent. From the pattisonizing kettles the refined lead goes to the molds as fully indicated on the flow sheet.

The zinc skim from the desilverizing kettle is next retorted, the retort being of the Faber du Faur type and oil fired, about 1250 pounds of the zinc skim forming a charge. In this connection it may be stated that by the new process I produce cleaner zinc skims and have less zinc to retort than under the old, the reason for this being that the major portion of the copper has been segregated from the lead bullion before the latter reaches the desilverizing kettle in which the presence of an excessive quantity of copper would be a serious objection on account of the large amount of zinc which would necessarily be absorbed by it before the zinc could take up the silver. The necessary segregation of the copper from the bullion in the early stages of the process is brought about, as shown by the flow sheet, (1) by liquation (in kettles) to the extent of getting the bullion down to .05% copper, the resulting copper dross being charged into the residue furnace; and (2) by segregation of the copper from the metal in the desilverizing kettle in the form of copper skim which is likewise charged into the residue furnace. The products of the retort are retort zinc, blue powder, retort metal or bullion and dross from retort metal. The retort zinc is conducted to the stock pile and used over again in the desilverizing operation; the blue powder is sent to the zinc smelter; and the retort metal or bullion is charged into the cupel furnace which is preferably of the Rhodes type. In practice the retort metal is poured into a slag pot and first drossed, after which the metal free of dross is poured direct into the cupel. As well understood in the art this metal will start to make litharge immediately on hitting the bath of the cupel. As soon as sufficient litharge is formed to cover the bath, the dross removed from the retort metal is charged into the cupel, the litharge being availed of to slag the dross. The retort metal dross is substantially a mixture of zinc oxid and alloys of copper, zinc, and lead, the copper going in the metal which is being cupeled and coming off later as copper litharge. The retort metal and dross might be charged together into the cupel, but since the dross can not be slagged until sufficient litharge is formed to effect the slagging, the better practice is to first dross the metal, then charge the metal into the cupel, and as soon thereafter as sufficient litharge is formed, feed in the dross. In charging the dross on the litharge bath and slagging it, it does not appreciably change the color of the litharge. The copper litharge resulting from the slagging of the retort metal dross as aforesaid, is a litharge slag which is removed in the last stages of the operation, said slag being liquid and of a dark red or reddish brown color, and readily distinguishable and separable from the yellow litharge formed during the cupeling operation. The copper litharge or slag is charged into the residue furnace where, with other copper drosses and skims it is reduced to a lead copper matte. It may be stated in passing that the retort breakings are fed to the crusher, the crushed materials being charged into the residue furnace as indicated on the flow sheet.

As previously stated, the moment cupellation begins, or as soon as the retort metal or bullion strikes the bath of the cupel, yellow litharge begins to form; and when liquid and before the copper litharge is removed (said copper litharge being the last slag that runs off from the cupel before the doré is fine), the yellow litharge is run into the reducing hearth operating in conjunction with the cupel, enough reducer being added to the charge in the hearth to drop about 3% of the metal, and heated up to form a fluid slag which is a lead copper oxid with 1% to 3% of silica, and 1% to 3% CaO. This slag is charged into the residue furnace to be treated with copper dross, copper skim, copper litharge (from sources previously indicated), materials from the crusher as indicated on the flow sheet, and just enough lead sulfid ore or galena to reduce the copper to a lead copper matte; the products of the residue furnace being dross bullion which is returned to the liquating kettle for re-treatment, lead copper matte, and a slag free of copper and silver, this slag (a low grade antimony slag) going to the antimony blast furnace for the production of antimonial lead. The lead copper matte from the residue furnace goes to the crusher, the crushed matte being sold to the smelters. The metal dropped in the reducing hearth (a high grade lead) is returned to the cupel furnace the final refined product of which is doré bullion as well understood in the art. The test breakings from the cupel go to the crusher and from the crusher to the residue furnace. A part of the crushed test breakings and high grade crushed brick go to the reducing hearth, and low grade crushed brick from the crusher (together with crushed retort breakings) go to the residue furnace. Under the old process three residue operations were required, one of which was directly involved in the treatment of the copper litharge and yellow litharge from the cupel furnace, and another in the treatment of the skim from the refining furnace which in the new process is utilized as an oxidizing agent in the softening furnace. In the new process a single residue operation is sufficient; and since the yellow litharge from the cupel furnace has its silver returned to the cupel from the reducing hearth, the major portion of the silver in the litharge is prevented from going back through the process. The residue furnace is a reverberatory fired with coal, one of the products whereof is dross bullion, an impure lead bullion containing from 93% to 95% of lead, the balance being antimony, arsenic, copper, silver and gold in varying proportions, said bullion being returned to the liquating kettle to get rid of the copper. Under the old process this bullion was returned to the softening furnace.

Reference to the flow sheet discloses three sources of oxidizing agents that may be availed of for use in the softening furnace, to wit, refiner skim, molding skim, and Pattison skim, all these operating to hasten the softening operation and to increase the lead content in the softening furnace by passing their oxygen over to the arsenic and antimony and dropping the lead. There may be still another source on which to draw for our oxidizing agent, and that is the yellow litharge from the cupels, provided it be free of copper. This practice is not recommended however as the litharge usually contains some copper (oxid); and as arsenic and antimony have a greater affinity for oxygen than has copper, the lead bullion takes up the copper as fast as it is reduced by these metals. Under the new process the yellow litharge and its associated copper are reduced on the reducing hearth to the extent previously indicated, the slag going to the residue furnace wherein is produced a lead copper matte and a low grade antimony slag free of copper and silver. In this way I prevent the copper in the litharge from returning to the softening furnace.

Features on the flow sheet to which no reference has been made are well understood in the art; and as the flow sheet is self-explanatory there will be no occasion to enter into any extended discussion of these features. The chief innovations which the new process has wrought on the old may be said to consists (1) in the segregation and removal of the bulk of the copper from the liquating bullion whereby the copper is kept out of the softening furnace; (2) in the use of the oxidizing lead skims in the softening furnace to hasten the softening operation and increase the lead content; (3) in the specific treatment of the slag or skims from the softening furnace, in the preheating furnace to release the lead bullion held in mechanical suspension thereby; (4) in the subsequent treatment of the aforesaid slag or skims direct in the blast furnace for the production of antimonial lead, thus eliminating the residue furnace treatment of these skims as practised under the old process; (5) in the saving of zinc on desilverizing kettles, reduced cost of retorting and cupel operations as a result of the segregation and removal of the copper from the charge before said charge reaches the softening furnace; (6) in the treatment of copper dross from the liquating kettles, copper skim from the desilverizing kettles, and copper litharge from the cupels, in the residue furnace with lead sulfid ore for the production of lead copper matte, dross bullion, and a slag free from silver which goes to the blast furnace and is there treated with antimonial slag from the preheating furnace for the production of antimonial lead, the dross bullion from this operation being liquated, and then re-treated in the softening furnace; (7) in the treatment of the yellow litharge from the cupels, in the reducing hearth or furnace to prevent the major portion of the silver in the litharge from going back through the process, the lead slag from the reducing hearth going to the residue furnace for the recovery of copper as lead copper matte, and the high grade metal from the reducing hearth being returned to the cupels.

The innovations aforesaid result in the following advantages over the old process, to wit, (1) a greater direct output of refined lead by the use of refinery skim in the softeners; (2) saving of rehandling of first and second skimmings in residue furnace; (3) elimination of loss of silver, gold, lead, and antimony in fume in residue furnace operations; (4) elimination of the re-treatment of residue bullion in the softeners; (5) saving smelting in the blast furnace of refinery skimmings; (6) a direct saving of silver in the resulting slag from the softeners, as this slag is lower in silver than the slag under the old process; (7) saving of interest on money tied up on account of stock on hand; (8) a material saving in the cost per ton of bullion treated.

The term "decopperized" as used in the present connection is to be understood as contemplating not necessarily the removal of all the copper from the lead bullion undergoing liquation, but a removal to an extent where the copper no longer gives trouble in the desilverizing and subsequent operations. In practice, if the bullion is decopperized or reduced to a copper content of .05% or .03%, the new process herein gives excellent results.

Having described my invention what I claim is:

1. In the treatment of lead bullion, the process of liquating a charge of the metal to segregate therefrom the bulk of the copper, removing the resulting copper dross, subjecting the decopperized metal to the action of oxidizing agents to effect the separation of the impurities therefrom in the form of lead antimony slag, and recovering the antomonial lead from said slag.

2. In the treatment of lead bullion, the process of liquating a charge of the metal to segregate therefrom the bulk of the copper, removing the resulting copper dross, subjecting the decopperized metal to oxidation in the presence of oxidizing agents carrying lead to effect the separation of the impurities therefrom in the form of slag, and recovering the antimonial lead from said slag.

3. In the treatment of lead bullion, the process of liquating a charge of the metal to segregate the bulk of the copper, removing the resulting copper dross, subjecting the decopperized metal to oxidation in the presence of oxidizing agents carrying lead and zinc to effect separation of the impurities in the form of slag and to reduce the lead content of the slag, and recovering the antimonial lead from said slag.

4. In the treatment of lead bullion, the process of decopperizing a charge of the metal, subjecting the decopperized metal in a molten condition to the action of oxidizing agents to slag off the impurities, removing said slag and subjecting the same to sufficient heat to render the same fluid and cause the mechanically held bullion therein to be released therefrom and carry down any silver and gold associated therewith.

5. In the treatment of lead bullion, the process of liquidating a charge of the metal to segregate the copper therefrom, removing the resulting copper dross, subjecting the decopperized molten metal to oxidation in the presence of metallic oxides for oxidizing the antimony and arsenic and forming a slag, removing the slag and heating it to render the same fluid to cause the release therefrom of the mechanically held bullion, returning the released bullion to the main decopperized charge undergoing oxidation, and recovering the antimonial lead from the slag.

6. In the treatment of lead bullion, the process of subjecting a charge of bullion to the softening action of suitable oxidizing agents to oxidize the impurities and form a slag or skim, removing said slag, subjecting the softened bullion to zinc treatment to desilverize tne lead, oxidizing the impurities in the desilverized lead to form a refiner skim, adding said skim to the charge subjected to the softening action aforesaid, drossing the desilverized lead of copper skim, and retorting the final zinc skim.

7. In the treatment of lead bullion, the process of retorting the zinc skim from a charge of desilverized bullion, cupeling the resulting retort bullion, reducing the yellow litharge from the cupels, and returning the high grade bullion from said reduction to the main charge of retort bullion in the cupel.

8. In the treatment of lead bullion, the process of subjecting a charge of decopperized bullion to the softening action of suitable oxidizing agents to oxidize the impurities and form a slag or skim, removing said skim, treating the softened bullion with zinc to desilverize the lead, oxidizing the impurities in the desilverized lead to form refiner skim, adding said skim to the softening charge, drossing the desilverized lead of copper skim, and retorting the final zinc skim.

9. In the treatment of lead bullion, the process of subjecting a charge of decopperized bullion to the softening action of suitable oxidizing agents to oxidize the impurities and form a slag or skim, removing said skim, treating the softened bullion with zinc to desilverize the lead, oxidizing the impurities in the desilverized lead to form refiner skim, molding the refined lead while hot and forming molding skim, adding the refiner and molding skims to the softening charge, drossing the desilverized lead of copper skim, and retorting the final zinc skim.

10. In the treatment of lead bullion, the process of subjecting a charge of liquated bullion to the softening action of suitable oxidizing agents, removing the skim of impurities or slag thus formed, charging the slag into a suitable settler maintained at proper temperature to keep the slag fluid and thereby release the bullion held mechanically by the slag, returning the released bullion to the softening charge, and removing the slag for further treatment.

11. In the treatment of lead bullion, the process of subjecting a charge of liquated bullion to the softening action of suitable oxidizing agents, removing the slag or skim thus formed, charging the slag into a settler and maintaining the same at a temperature sufficient to bring about a release of the bullion mechanically held by the slag, returning the released bullion to the softening charge, and treating the slag for the recovery of antimonial lead.

12. In the treatment of lead bullion, the process of liquating a charge of the metal to segregate the copper, removing the copper dross thus formed, subjecting the decopperized liquated lead bullion to the softening action of suitable oxidizing agents, removing the resulting slag or skim, desilverizing the softened lead bullion by means of zinc, refining the desilverizing lead by oxidation of the impurities, adding the refiner skim to the softening lead bullion, retorting the zinc skim from the desilverizing operation, cupeling the retort bullion, reducing the yellow litharge from the cupeling operation, returning the high grade metal from said reduction to the cupels, charging the resulting slag from said reduction and the copper litharge from the cupeling operation into a suitable residue furnace, charging the copper dross from the liquating operation into said residue furnace, charging the copper skim from the desilverizing operation into said residue furnace, adding a complement of sulfid ore to the materials charged into the residue furnace, treating the combined charges to reduce the metals to a lead copper matte and a slag free of copper and silver, and at the same time form dross bullion, and returning said dross bullion to the liquating charge.

13. In the treatment of lead bullion, the process of liquating a charge of the metal and segregating the copper therefrom, removing the resulting copper dross, subjecting the decopperized liquated metal to the softening action of suitable oxidizing agents, removing the resulting slag or skim, heating the slag to a degree of fluidity to effect a release or precipitation of the mechanically held bullion, returning said bullion to the softening charge, removing the slag thus freed from its bullion, desilverizing the softened lead bullion by means of zinc, refining the desilverized lead by oxidation of its impurities, adding the refiner skim to the softening bath, retorting the zinc skim from the desilverizing operation, cupeling the retort bullion, reducing the yellow litharge from the cupeling operation, returning the high grade lead from said reduction to the cupels, charging the resulting slag from said reduction and the copper litharge from the cupeling operation into a suitable residue furnace, charging the copper dross from the liquating operation into said residue furnace, charging the copper skim from the desilverizing operation into said residue furnace, adding a complement of sulfid ore to the materials charged into the residue furnace, treating the combined charges to reduce the metals to a lead copper matte and a slag free of copper and silver, and at the same time form dross bullion, and returning said dross bullion to the liquating charge.

14. In the purification of lead bullion, the process of subjecting a charge of liquated decopperized metal to the softening action of suitable oxidizing agents, removing the resulting slag, heating the slag to make the same fluid and cause the lead bullion held mechanically thereby to drop, whereby a lead antimony slag is produced free of copper, silver and gold.

15. In the purification of lead bullion, the process of cupeling a charge of retort bullion, reducing the yellow litharge from the cupeling operation, heating the charge to fluidify the slag, charging said slag into a residue furnace with a complement of sulfid ore, and reducing the residue furnace charge to form a matte, and a slag free of copper and silver.

16. In the treatment of lead bullion, the process of liquating a charge of the metal to segregate therefrom the bulk of the copper, removing the resulting copper dross, subjecting the decopperized metal to oxidation in the presence of metallic oxids reacting with the antimony and arsenic impurities to form a slag, and removing said slag.

17. In the purification of lead bullion, the process of cupeling a charge of retort bullion, reducing the yellow litharge from the cupeling operation, heating the charge to fluidify the slag, charging said slag into a residue furnace with a complement of material carrying lead sulfid, and reducing the residue furnace charge to form a matte, lead bullion, and a slag free of copper.

In testimony whereof I affix my signature, in presence of two witnesses.

GEORGE P. HULST.

Witnesses:
F. E. STOLLE,
JAMES O. JOHNSTONE.